(12) United States Patent
Sharma (10) Patent No.: US 7,406,314 B2
(45) Date of Patent: Jul. 29, 2008

(54) WIRELESS TRANSMIT RECEIVE UNIT HAVING A TRANSITION STATE FOR TRANSITIONING FROM MONITORING TO DUPLEX CONNECTED STATES AND METHOD

(75) Inventor: Sanjeev Sharma, Norristown, PA (US)

(73) Assignee: Interdigital Technology Corporation, Wilmington, DE (US)

( * ) Notice: Subject to any disclaimer, the term of this patent is extended or adjusted under 35 U.S.C. 154(b) by 215 days.

(21) Appl. No.: 10/878,751

(22) Filed: Jun. 28, 2004

(65) Prior Publication Data
US 2005/0009527 A1 Jan. 13, 2005

Related U.S. Application Data

(60) Provisional application No. 60/486,584, filed on Jul. 11, 2003.

(51) Int. Cl.
*H04Q 7/20* (2006.01)
(52) U.S. Cl. ............ 455/445; 455/435.1; 455/433; 455/412.1
(58) Field of Classification Search ............. 455/435.1, 455/433, 412.1
See application file for complete search history.

(56) References Cited

U.S. PATENT DOCUMENTS 6,606,498 B2 * 8/2003 Chen et al. ............ 455/450
7,027,811 B2 4/2006 Pedlar 2003/0050097 A1 * 3/2003 Amirijoo et al. ............ 455/560
2004/0224686 A1 * 11/2004 Pedlar ............ 455/435.1

OTHER PUBLICATIONS

"Technical Specification Group Radio Access Network; Radio Resource Control (RRC) Protocol Specification," 3GPP TS 25.331, V3.15.0 (Jun. 2003), Release 1999.
"Annex B (informative): Description of RRC State Transitions," 3GPP TS 25.331 V3.15.0 (Jun. 2003), Release 1999.
Third Generation Partnership Project; Technical Specification Group Radio Access Network; Medium Access Control (MAC) Protocol Specification (Release 1999); 3GPP TS 25.321, V 3.15.0 (Mar. 2003).
Third Generation Partnership Project; Technical Specification Group Radio Access Network; Medium Access Control (MAC) Protocol Specification (Release 1999); 3GPP TS 25.321, V 3.17.0 (Jun. 2004).

(Continued)

*Primary Examiner*—George Eng
*Assistant Examiner*—Muthuswamy G Manoharan
(74) *Attorney, Agent, or Firm*—Volpe and Koenig, PC (57) ABSTRACT

A wireless transmit/receive unit (WTRU) and method for wireless uplink communication to and downlink communication from a wireless network are provided. The WTRU has a selectively configurable transceiver that has a network connected mode defined by a plurality of functional states including at least one monitoring state and a duplex state. The transceiver is configured to transition from a monitoring state upon occurrence of predefined WTRU events that are each associated with a respective uplink procedure initiation communication where at least one of procedures results in a network response that includes a temporary identifier. The transceiver is configurable into a transition state wherein the transceiver is configured to send only the uplink initiation communications and is otherwise configured only for downlink communications.

16 Claims, 6 Drawing Sheets

OTHER PUBLICATIONS

Third Generation Partnership Project; Technical Specification Group Radio Access Network; Medium Access Control (MAC) Protocol Specification (Release 4); 3GPP TS 25.321, V 4.8.0 (Mar. 2003).

Third Generation Partnership Project; Technical Specification Group Radio Access Network; Medium Access Control (MAC) Protocol Specification (Release 4); 3GPP TS 25.321, V 4.10.0 (Jun. 2004).

Third Generation Partnership Project; Technical Specification Group Radio Access Network; Medium Access Control (MAC) Protocol Specification (Release 5); 3GPP TS 25.321, V 5.5.0 (Jun. 2003).

Third Generation Partnership Project; Technical Specification Group Radio Access Network; Medium Access Control (MAC) Protocol Specification (Release 5); 3GPP TS 25.321, V 5.9.0 (Jun. 2004).

ThirdGeneration Partnership Project; Technical Specification Group Radio Access Network; Medium Access Control (MAC) Protocol Specification (Release 6); 3GPP TS 25.321, V 6.2.0 (Jun. 2004).

Third Generation Partnership Project; Technical Specification Group Radio Access Network; Radio Resource Control (RRC) Protocol Specification (Release 1999); 3GPP TS 25.331, V 3.15.0 (Jun. 2003).

Third Generation Partnership Project; Technical Specification Group Radio Access Network; Radio Resource Control (RRC) Protocol Specification (Release 1999); 3GPP TS 25.331, V 3.19.0 (Jun. 2004).

Third Generation Partnership Project; Technical Specification Group Radio Access Network; Radio Resource Control (RRC) Protocol Specification (Release 4); 3GPP TS 25.331, V 4.10.0 (Jun. 2003).

Third Generation Partnership Project; Technical Specification Group Radio Access Network; Radio Resource Control (RRC) Protocol Specification (Release 4); 3GPP TS 25.331, V 4.14.0 (Jun. 2004).

Third Generation Partnership Project; Technical Specification Group Radio Access Network; Radio Resource Control (RRC) Protocol Specification (Release 5); 3GPP TS 25.331, V 5.5.0 (Jun. 2003).

Third Generation Partnership Project; Technical Specification Group Radio Access Network; Radio Resource Control (RRC) Protocol Specification (Release 5); 3GPP TS 25.331, V 5.8.0 (Mar. 2004).

Third Generation Partnership Project; Technical Specification Group Radio Access Network; Radio Resource Control (RRC) Protocol Specification (Release 6); 3GPP TS 25.331, V 6.1.0 (Mar. 2004).

* cited by examiner

WIRELESS TRANSMIT RECEIVE UNIT HAVING A TRANSITION STATE FOR TRANSITIONING FROM MONITORING TO DUPLEX CONNECTED STATES AND METHOD

CROSS REFERENCE TO RELATED APPLICATION(S)

This application claims priority U.S. provisional application No. 60/486,584 filed Jul. 11, 2003, which is incorporated by reference as if fully set forth.

FIELD OF INVENTION

The present invention relates to methods and components for wireless communication equipment and, in particular, methods and components for facilitating efficient maintenance of wireless communications.

BACKGROUND

Wireless telecommunication systems are well known in the art. In order to provide global connectivity for wireless systems, standards have been developed and are being implemented. One current standard in widespread use is known as Global System for Mobile Telecommunications (GSM). This is considered as a so-called Second Generation mobile radio system standard (2G) and was followed by its revision (2.5G). GPRS and EDGE are examples of 2.5G technologies that offer relatively high speed data service on top of (2G) GSM networks. Each one of these standards sought to improve upon the prior standard with additional features and enhancements. In January 1998, the European Telecommunications Standard Institute—Special Mobile Group (ETSI SMG) agreed on a radio access scheme for Third Generation Radio Systems called Universal Mobile Telecommunications Systems (UMTS). To further implement the UMTS standard, the Third Generation Partnership Project (3GPP) was formed in December 1998. 3GPP continues to work on a common third generational mobile radio standard.

Figure 1A:
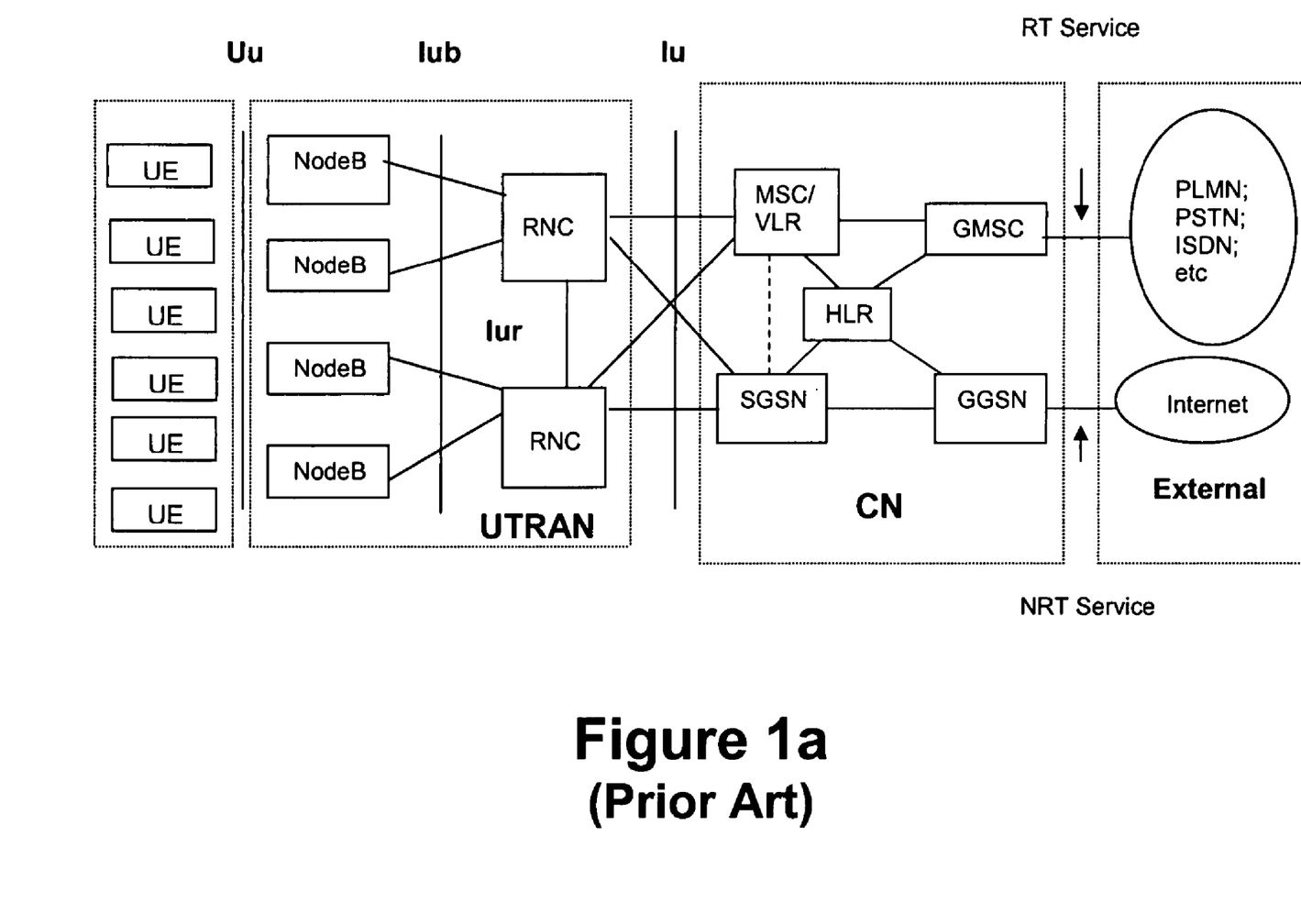
FIG. 1a shows an overview of a system architecture of a conventional UMTS network.

A typical UMTS system architecture in accordance with current 3GPP specifications is depicted in FIG. 1a. The UMTS network architecture includes a Core Network (CN) interconnected with a UMTS Terrestrial Radio Access Network (UTRAN) via an interface known as Iu which is defined in detail in the current publicly available 3GPP specification documents. The UTRAN is configured to provide wireless telecommunication services to users through wireless transmit receive units (WTRUs), known as User Equipments (UEs) in 3GPP, via a radio interface known as Uu. The UTRAN has one or more Radio Network Controllers (RNCs) and base stations, known as Node Bs in 3GPP, which collectively provide for the geographic coverage for wireless communications with UEs. One or more Node Bs is connected to each RNC via an interface known as Iub in 3GPP. The UTRAN may have several groups of Node Bs connected to different RNCs; two are shown in the example depicted in FIG. 1. Where more than one RNC is provided in a UTRAN, inter-RNC communication is performed via an Iur interface.

Communications external to the network components are performed by the Node Bs on a user level via the Uu interface and the CN on a network level via various CN connections to external systems.

In general, the primary function of base stations, such as Node Bs, is to provide a radio connection between the base stations' network and the WTRUs. Typically a base station emits common channel signals allowing non-connected WTRUs to become synchronized with the base station's timing. In 3GPP, a Node B performs the physical radio connection with the UEs. The Node B receives signals over the Iub interface from the RNC that control the radio signals transmitted by the Node B over the Uu interface.

A CN is responsible for routing information to its correct destination. For example, the CN may route voice traffic from a UE that is received by the UMTS via one of the Node Bs to a public switched telephone network (PSTN) or packet data destined for the Internet. In 3GPP, the CN has six major components: 1) a serving General Packet Radio Service (GPRS) support node; 2) a gateway GPRS support node; 3) a border gateway; 4) a visitor location register; 5) a mobile services switching center; and 6) a gateway mobile services switching center. The serving GPRS support node provides access to packet switched domains, such as the Internet. The gateway GPRS support node is a gateway node for connections to other networks. All data traffic going to other operator's networks or the internet goes through the gateway GPRS support node. The border gateway acts as a firewall to prevent attacks by intruders outside the network on subscribers within the network realm. The visitor location register is a current serving networks 'copy' of subscriber data needed to provide services. This information initially comes from a database which administers mobile subscribers. The mobile services switching center is in charge of 'circuit switched' connections from UMTS terminals to the network. The gateway mobile services switching center implements routing functions required based on current location of subscribers. The gateway mobile services also receives and administers connection requests from subscribers from external networks.

The RNCs generally control internal functions of the UTRAN. The RNCs also provides intermediary services for communications having a local component via an Iub interface connection with a Node B and an external service component via a connection between the CN and an external system, for example overseas calls made from a cell phone in a domestic UMTS.

Typically a RNC oversees multiple base stations, manages radio resources within the geographic area of wireless radio service coverage serviced by the Node Bs and controls the physical radio resources for the Uu interface. In 3GPP, the Iu interface of an RNC provides two connections to the CN: one to a packet switched domain and the other to a circuit switched domain. Other important functions of the RNCs include confidentiality and integrity protection. Background specification data for such systems are publicly available and continue to be developed.

In general, commercial wireless systems utilize a well defined system time frame format for the transmission of wireless communication signals. In communication systems such as Third Generation Partnership Project (3GPP) Time Division Duplex (TDD) and Frequency Division Duplex (FDD) systems, multiple shared and dedicated channels of variable rate data are combined for transmission.

Figure 1B:
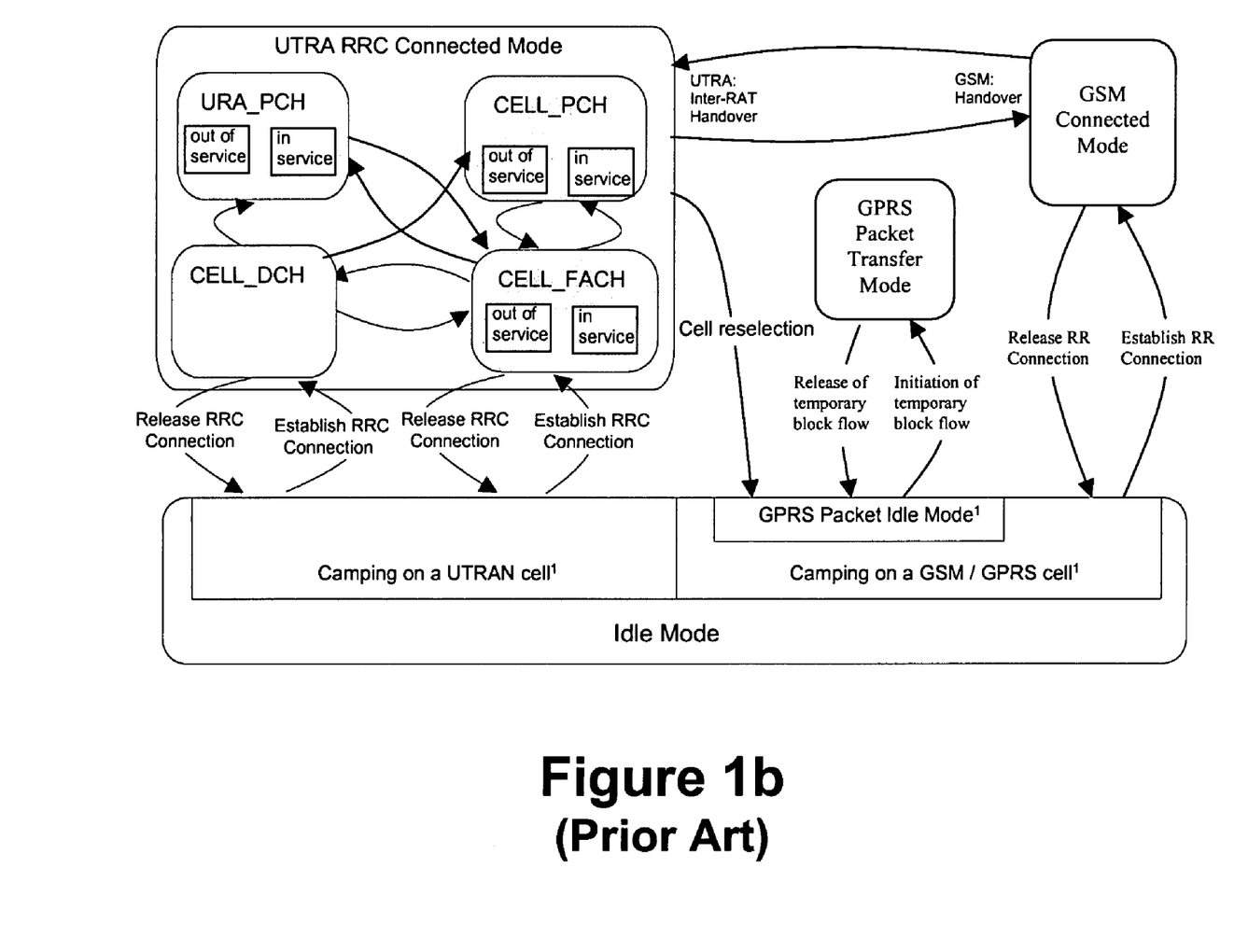
FIG. 1b is an illustration of RRC states and state transitions including GSM for a UE of a conventional 3GPP system.

There are four defined states in the Universal terrestrial radio access (UTRA) RRC Connected mode currently specified in 3GPP TS 25.331: Radio Resource Control (RRC) Protocol Specification as illustrated in FIG. 1b. These states include two duplex states, CELL_DCH and CELL_FACH, and two monitoring states CELL_PCH and URA_PCH. These states allow the UTRAN to allocate resources to the User Equipment (UE) on a demand basis.

The CELL_DCH state is a duplex state characterized by:
A dedicated physical channel is allocated to the UE in uplink and downlink.

The UE is known on cell level according to its current active set.

Dedicated transport channels, downlink and uplink (TDD) shared transport channels, and a combination of these transport channels can be used by the UE.

The CELL_DCH state is entered from an Idle Mode through the setup of an RRC connection, or by establishing a dedicated physical channel from the CELL_FACH state. A PDSCH may be assigned to the UE in this state, to be used for a DSCH. In TDD a PUSCH may also be assigned to the UE in this state, to be used for a USCH. If PDSCH or PUSCH are used for TDD, a FACH transport channel may be assigned to the UE for reception of physical shared channel allocation messages.

Transition from CELL_DCH to Idle Mode is realized through the release of the RRC connection. Transition from CELL_DCH to CELL_FACH state occurs when all dedicated channels have been released, which may be via explicit signaling (e.g. physical channel reconfiguration, radio bearer reconfiguration, radio bearer release, radio bearer setup, transport channel reconfiguration, etc.) or at the end of a time period for which the dedicated channel was allocated. Transition from CELL_DCH to CELL_PCH state occurs via explicit signaling (e.g. physical channel reconfiguration, radio bearer reconfiguration, radio bearer release, radio bearer setup, transport channel reconfiguration, etc.). Transition from CELL_DCH to URA_PCH state occurs via explicit signaling (e.g. physical channel reconfiguration, radio bearer reconfiguration, radio bearer release, radio bearer setup, transport channel reconfiguration, etc.).

Radio Resource Allocation tasks for the CELL_DCH state are specified. For the DCH, several physical channel allocation strategies may be applied. The allocations can be either permanent (needing a DCH release message) or based on time or amount-of-data. Resource allocation can be done separately for each packet burst with fast signaling on the DCH. For each radio frame the UE and the network indicate the current data rate (in uplink and downlink respectively) using the transport format combination indicator (TFCI). However, in TDD, DCH and DSCH or USCH may be mapped on different CCTrCHs, their TFCI are totally independent. DCH transmission is not modified by the simultaneous existence of DSCH/USCH. If the configured set of combinations (i.e. transport format set for one transport channel) are found to be insufficient to retain the QoS requirements for a transport channel, the network initiates a reconfiguration of the transport format set (TFS) for that transport channel. This reconfiguration can be done during or in between data transmission. Further, the network can reconfigure the physical channel allowing an increase or decrease of the peak data rate. For the uplink data transmission, the UE reports the observed traffic volume to the network in order for the network to re-evaluate the current allocation of resources. This report contains e.g. the amount of data to be transmitted or the buffer status in the UE.

RRC Connection mobility tasks for the CELL_DCH state are specified. Depending on the amount and frequency of data macrodiversity (soft handover) may or may not be applied. The RRC Connection mobility is handled by measurement reporting, soft handover and Timing re-initialized or Timing maintained hard handover procedures.

UE Measurements for the CELL_DCH state are specified. The UE performs measurements and transmit measurement reports according to the measurement control information. The UE uses the connected mode measurement control information received in other states until new measurement control information has been assigned to the UE.

Acquisition of system information in the CELL_DCH state is specified. FDD UEs with certain capabilities reads system information broadcast on FACH. TDD UEs reads the BCH to acquire valid system information. For each acquisition, the UE may need different combinations of system information broadcast on BCH. The scheduling on the broadcast channel is done in such way that the UE knows when the requested information can be found.

The CELL_FACH state is a duplex state characterized by:

No dedicated physical channel is allocated to the UE.

The UE continuously monitors a FACH in the downlink.

The UE is assigned a default common or shared transport channel in the uplink (e.g. RACH) that it can use anytime according to the access procedure for that transport channel.

The position of the UE is known by UTRAN on cell level according to the cell where the UE last made a cell update.

In TDD mode, one or several USCH or DSCH transport channels may have been established.

Transition from CELL_FACH to CELL_DCH state occurs, when a dedicated physical channel is established via explicit signaling (e.g. physical channel reconfiguration, radio bearer reconfiguration, radio bearer release, radio bearer setup, transport channel reconfiguration, etc.). Transition from CELL_FACH to CELL_PCH state occurs when UTRAN orders the UE to move to CELL_PCH state, which is done via explicit signaling (e.g. cell update confirm, radio bearer reconfiguration, etc.). Transition from CELL_FACH to Idle Mode occurs upon release of the RRC connection. Transition from CELL_FACH to URA_PCH State occurs when UTRAN orders the UE to move to URA_PCH state, which is done via explicit signaling (e.g. ura update confirm, radio bearer reconfiguration, etc.).

Radio Resource Allocation Tasks for the CELL_FACH state are specified. In the CELL_FACH state the UE monitors a FACH. It is enabled to transmit uplink control signals and it may be able to transmit small data packets on the RACH. The network can assign the UE transport channel parameters (e.g. transport format sets) in advance, to be used when a DCH is used. Upon assignment of the physical channel for DCH, the UE moves to CELL_DCH state and uses the preassigned TFS for the DCH. If no UE dedicated physical channel or transport channel configuration has been assigned, the UE uses the common physical channel and transport channel configuration according to the system information. For the uplink data transmission, the UE reports the observed traffic volume to the network in order for the network to re-evaluate the current allocation of resources. This report contains e.g. the amount of data to be transmitted or the buffer status in the UE. When there is either user or control data to transmit, a selection procedure determines whether the data should be transmitted on a common transport channel, or if a transition to CELL_DCH should be executed. The selection is dynamic and depends on e.g. traffic parameters (amount of data, packet burst frequency).

In FDD mode, the UTRAN can assign CPCH resources to the UE in CELL_FACH state. When CPCH resources are assigned, the UE will continue to monitor FACHs. When CPCH resources are assigned, the UE will use CPCH for all uplink traffic in accordance with RB mapping. In FDD mode, UTRAN may configure the UE to provide CPCH measurement reports of traffic volume on each CPCH channel used. With these measures, the UTRAN can reallocate network resources on a periodic basis. The UTRAN allocates CPCH Sets to each cell and assigns UEs to one of the cell's CPCH Sets. The UEs can dynamically access the CPCH resources without further UTRAN control.

In the TDD mode, the UTRAN can assign USCH/DSCH resources to the UE in CELL_FACH state. When USCH/DSCH resources are assigned, the UE will continue to monitor FACHs, depending on the UE capability. The UE may use the USCH/DSCH to transmit signaling messages or user data in the uplink and/or the downlink using USCH and/or DSCH when resources are allocated to cell and UE is assigned use of those USCH/DSCH. For the uplink data transmission on USCH the UE reports to the network the traffic volume (current size of RLC data buffers), The UTRAN can use these measurement reports to re-evaluate the current allocation of the USCH/DSCH resources.

RRC Connection mobility tasks for the CELL_FACH state are specified. In this state the location of the UE is known on cell level. A cell update procedure is used to report to the UTRAN, when the UE selects a new cell to observe the common downlink channels of a new cell. Downlink data transmission on the FACH can be started without prior paging. The UE monitors the broadcast channel and system information on BCCH of its own and neighbor cells and from this the need for the updating of cell location is identified. The UE performs cell reselection and upon selecting a new UTRA cell, it initiates a cell update procedure. Upon selecting a new cell belonging to another radio access system than UTRA, the UE enters idle mode and makes an access to that system according to its specifications.

UE Measurements for the CELL_FACH state are specified. The UE performs measurements and transmit measurement reports according to the measurement control information. By default, the UE uses the measurement control information broadcast within the system information. However, for measurements for which the network also provides measurement control information within a MEASUREMENT CONTROL message, the latter information takes precedence.

Transfer and update of system information for the CELL_FACH state is specified. The UE reads the BCH to acquire valid system information. For each acquisition, the UE may need different combinations of system information broadcast on BCH. The scheduling on the broadcast channel is done in such way that the UE knows when the requested information can be found. When the system information is modified, the scheduling information is updated to reflect the changes in system information transmitted on BCH. The new scheduling information is broadcast on FACH in order to inform UEs about the changes. If the changes are applicable for the UE, the modified system information is read on BCH.

The CELL_PCH state is a monitoring (i.e. non-duplex) state characterized by:
  No dedicated physical channel is allocated to the UE.
  The UE selects a PCH with a specified algorithm and uses DRX for monitoring the selected PCH via an associated PICH.
  No uplink activity is possible.
  The position of the UE is known by UTRAN on cell level according to the cell where the UE last made a cell update in CELL_FACH state.
  The DCCH logical channel cannot be used in this state. If the network wants to initiate any activity, it needs to make a paging request on the PCCH logical channel in the known cell to initiate any downlink activity.

Transition from CELL_PCH to CELL_FACH state occurs
  a) by paging from UTRAN (PAGING TYPE1 message) or
  b) through any uplink access. The release of an RRC connection is not possible in the CELL_PCH state. The UE will first move to CELL_FACH state to perform a release signaling.

Radio Resource Allocation Tasks for the CELL_PCH state are specified. In CELL_PCH state no resources have been granted for data transmission. For this purpose, a transition to another state has to be executed. The UE may use Discontinuous Reception (DRX) in order to reduce power consumption. When DRX is used the UE needs only to receive at one paging occasion per DRX cycle. The UE may be instructed to use a specific DRX cycle length by the network. The UE determines its paging occasions in the same way as for Idle Mode, although is this connected mode state, UTRAN DRX cycle length coefficient is also taken into consideration.

RRC Connection mobility tasks for the CELL_PCH state are specified. In the CELL_PCH state, the UE mobility is performed through cell reselection procedures. The UE performs cell reselection and upon selecting a new UTRA cell, it moves to CELL_FACH state and initiates a cell update procedure in the new cell. After the cell update procedure has been performed, the network may direct the UE to change its state back to CELL_PCH state if neither the UE nor the network has any more data to transmit. Upon selecting a new cell belonging to another radio access system than UTRA, the UE enters idle mode and make an access to that system according to its specifications. In case of low UE activity, UTRAN may want to reduce the cell-updating overhead by ordering the UE to move to the URA_PCH State. This transition is made via the CELL_FACH state. UTRAN may apply an inactivity timer, and optionally, a counter, which counts the number of cell updates e.g. UTRAN orders the UE to move to URA_PCH when the number of cell updates has exceeded certain limits (network parameter).

UE Measurements for the CELL_PCH state are specified. The UE performs measurements and transmit measurement reports according to the measurement control information. The UE uses the measurement control information according to the system information when no UE dedicated measurement control information has been assigned.

Transfer and update of system information for the CELL_PCH state is specified. The UE reads the BCH to acquire valid system information. For each acquisition, the UE may need different combinations of system information broadcast on BCH. The scheduling on the broadcast channel is done in such way that the UE knows when the requested information can be found.

The URA_PCH state is a monitoring state characterized by:
  No dedicated channel is allocated to the UE.
  The UE selects a PCH with a specified algorithm and uses DRX for monitoring the selected PCH via an associated PICH.
  No uplink activity is possible.
  The location of the UE is known on UTRAN Registration area level according to the URA assigned to the UE during the last URA update in CELL_FACH state.
  The DCCH logical channel cannot be used in this state. If the network wants to initiate any activity, it needs to make a paging request on the PCCH logical channel within the URA where the location of the UE is known. If the UE needs to transmit anything to the network, it goes to the CELL_FACH state. The transition to URA_PCH State can be controlled with an inactivity timer, and optionally, with a counter that counts the number of cell updates. When the number of cell updates has exceeded certain limits (a network parameter), then the UE changes to the URA_PCH State. URA updating is initiated by the UE, which, upon the detection of the Registration area, sends the network the Registration area update information on the RACH of the new cell.

Transition from URA_PCH State to CELL_FACH State occurs:

a) when uplink access is performed by RACH.

b) by paging from UTRAN (PAGING TYPE1 message). The release of an RRC connection is not possible in the URA_PCH State. The UE will first move to CELL_FACH State to perform the release signaling.

Radio Resource Allocation Tasks for the URA_PCH state are specified. In URA_PCH State no resources have been granted for data transmission. For this purpose, a transition to CELL_FACH State has to be executed. The UE may use Discontinuous Reception (DRX) in order to reduce power consumption. When DRX is used the UE needs only to receive at one paging occasion per DRX cycle. The UE may be instructed to use a specific DRX cycle length by the network. The UE determines its paging occasions in the same way as for Idle Mode, although is this connected mode state, UTRAN DRX cycle length coefficient is also taken into consideration.

RRC Connection mobility tasks for the URA_PCH state are specified. In URA_PCH State the location of a UE is known on UTRAN Registration area level. In this state, the UE mobility is performed through URA reselection procedures. The UE performs cell reselection and upon selecting a new UTRA cell belonging to a URA that does not match the URA used by the UE, the UE moves to CELL_FACH state and initiates a URA update towards the network. After the URA update procedure has been performed, the network may direct the UE to change its state back to URA_PCH state if neither the UE nor the network has any more data to transmit. Upon selecting a new cell belonging to another radio access system than UTRA, the UE enters idle mode and makes an access to that system according to its specifications.

UE Measurements for the URA_PCH state are specified. The UE performs measurements and transmit measurement reports according to the measurement control information. The UE uses the measurement control information according to the system information when no UE dedicated measurement control information has been assigned.

Transfer and update of system information for the URA_PCH state is specified. The same mechanisms to transfer and update system information as for state CELL_PCH are applicable for UEs in URA_PCH state. The UE is put into the CELL_PCH or URA_PCH state by the UTRAN depending on the traffic activity originating from the UE.

At the access stratum level, the UE is identified either by a) U-RNTI b) C-RNTI While using the common transport channels (e.g., RACH, FACH, PCH), UTRAN recognizes the UE using one of the above identifiers. C-RNTI gets deleted when entering the CELL_PCH or URA_PCH state. It also gets deleted when UE reselects a cell for communication via a different base station, even while in a CELL_FACH state.

Whenever the UE transitions from CELL_PCH or URA_PCH state to CELL_FACH state, it performs a respective Cell Update or URA Update procedure. Also, if the UE does not have a valid C-RNTI in the CELL_FACH state, such as when reselecting a cell, it needs to get one from the UTRAN via the Cell Update procedure. The UE transmits a CELL_UPDATE or URA_UPDATE message on the common control channel (CCCH). A CELL_UPDATE_CONFIRM response message is built and sent by the UTRAN on either on a CCCH or DCCH.

Figure 2A:
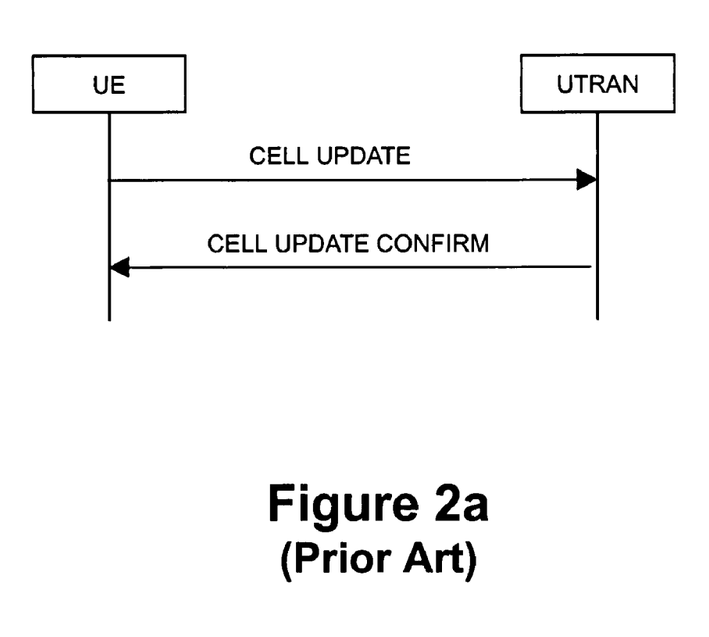
FIGS. 2a and 2b are time line illustrations of conventional cell update procedures of two types, without and with a response from a UE, respectively.
Figure 2B:
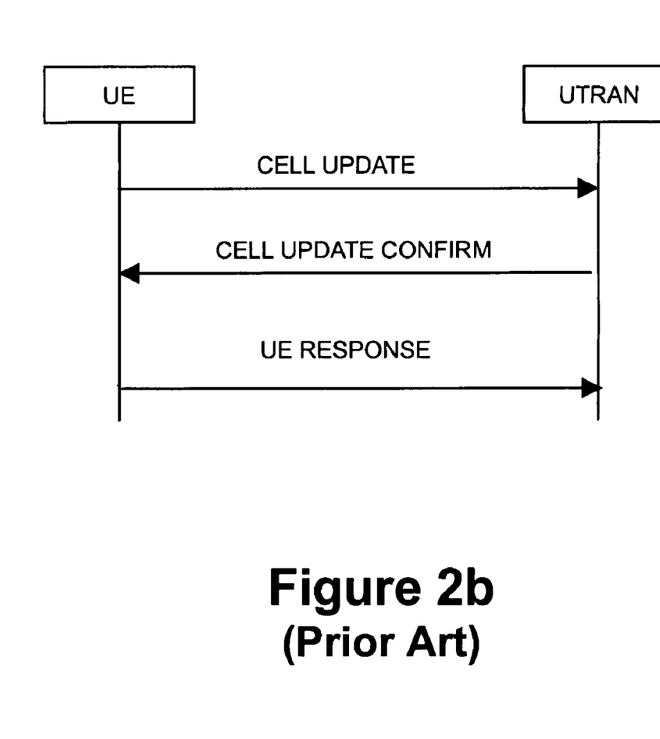

FIGS. 2a and 2b illustrate successful Cell Update scenarios. FIG. 2a shows the basic flow without a response from the UE; FIG. 2b shows the basic flow with a response from the UE in accordance with 3GPP TS 25.331: Radio Resource Control (RRC) Protocol Specification. The URA Update procedure is similar.

As noted above, all of the existing connected mode UE state transitions, except coming out of CELL_PCH or URA_PCH, are UTRAN directed (i.e. UTRAN orders UE to be come into the indicated state). In comparison, the UE is configured to transition out of the CELL_PCH or URA_PCH monitoring states depending on events occurring at the UE. As stated above, these transitions take place in connection with either a Cell Update or URA Update procedure which procedures are initiated by the UE entering the CELL_FACH duplex state.

The applicable standard specifications (including 3GPP TS 25.331: Radio Resource Control (RRC) Protocol Specification, and 3GPP 25.321: Medium Access Control (MAC) Protocol Specification) state that the UE enters CELL_FACH state when a Cell Update or URA Update procedure starts. This is intended because a CELL_UPDATE_CONFIRM or URA_UPDATE_CONFIRM message can be received on a DCCH, which is unavailable in the CELL_PCH or URA_PCH state. However, the inventors have recognized a problem with this transition, since the UE is without a temporary identifier, such as a C-RNTI, until a response to the update procedure is received by the UE. Also, the inventors have recognized a problem due to the UE losing its C-RNTI when it reselects a cell in the CELL_FACH state.

For mapping the DCCH or DTCH logical channels over RACH (transport channel for uplink), UE MAC uses the C-RNTI in MAC data PDU header (see standard 3GPP 25.321: Medium Access Control (MAC) Protocol Specification). As a result, the DCCH or DTCH transmission over RACH is not feasible unless the UE has a C-RNTI. On the other hand, the UTRAN can send downlink DCCH or DTCH messages over FACH, by using the U-RNTI in the MAC data PDU header. Hence the inventors have recognized that the UE can only have a half duplex downlink link for DCCH or DTCH until it has a C-RNTI.

Two manifestations of the problem identified by the inventors with the state configurations currently specified in 3GPP TS 25.331: Radio Resource Control (RRC) Protocol Specification are set forth below in connection with FIGS. 3 and 4.

Figure 3:
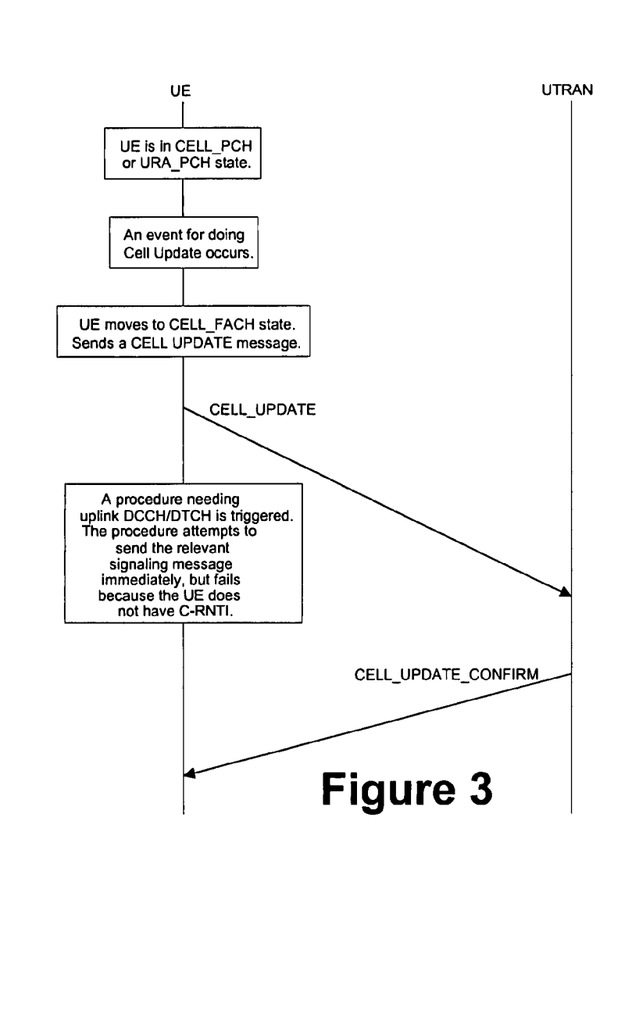
FIG. 3 is a timeline illustration of a first communication scenario illustrating a potential communication problem when utilizing the conventional duplex CELL_FACH state.

FIG. 3 illustrates problematic UE behavior where the UE is placed in the CELL_FACH state without a C-RNTI to initiate a Cell Update procedure. As shown in FIG. 3, the UE starts in a monitoring state, in this case the CELL_PCH state. An event occurs requiring the Cell Update procedure. Under current specifications, the UE is transitioned into the duplex CELL_FACH state in order to perform the Cell Update procedure which requires an uplink initiation by the UE. In the CELL_FACH state, the UE then send the appropriate request via a CELL_UPDATE message which is received by the UTRAN. The UTRAN processes the CELL_UPDATE message and responds with a CELL_UPDATE_CONFIRM message that includes a temporary identifier such as a C-RNTI.

This is problematic where another event occurs that require uplink messaging before the UE receives the CELL_UPDATE_CONFIRM message, i.e. before it receives the C-RNTI. Upon entering the duplex CELL_FACH state, the UE supports all the RRC procedures applicable to CELL_FACH state. For example, it is then specified as being configured to perform 'Initial Direct Transfer' or 'Uplink Direct Transfer' such as set forth in 3GPP TS 25.331 that require DCCH or DTCH uplink transmissions. However, when the UE is in the CELL_FACH state but without a C-RNTI, the UE has only a half duplex (downlink) DCCH. As a result, the UE is not able to transmit 'Initial Direct Transfer' or 'Uplink Direct Transfer' messaging resulting in a failure to properly transmit such uplink messaging which it should be capable of when in the CELL_FACH state. A number of such scenarios are possible because the UE non-access stratum has two independent state machines for circuit-switched (CS) and packet-switched (PS) services. Both of these utilize the common RRC connection or in other words the common RRC state.

Figure 4:
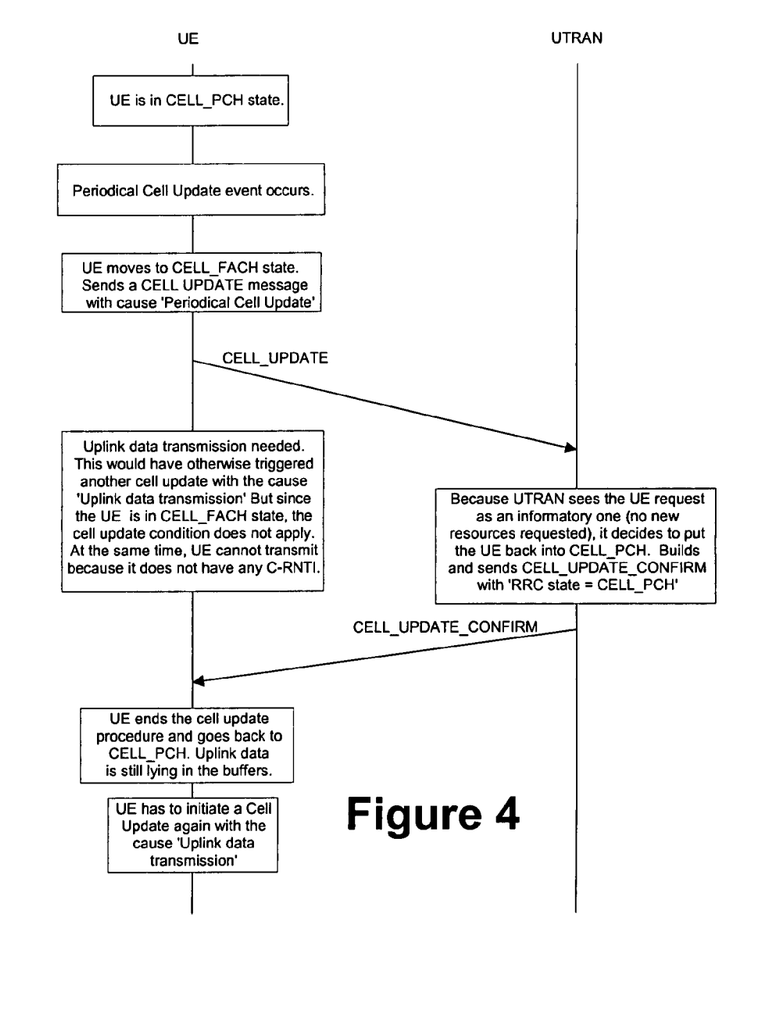
FIG. 4 is a timeline illustration of a second communication scenario illustrating a potential communication problem when utilizing the conventional duplex CELL_FACH state.

A variation of the problem that has been recognized by the inventors occurs where Periodic Cell or URA Updates are processed. A high priority Cell or URA Update can be delayed due to UE's operation in the CELL_FACH state while it is without a C-RNTI. For example, as illustrated in FIG. 4, the UE in the CELL_PCH state initiates a periodical cell update procedure by transitioning to the CELL_FACH state and transmitting a CELL_UPDATE message that indicates that it is a periodic cell update request. The UTRAN upon receiving such a period request treats it as a request for information, not resources, so that the UTRAN responds with a CELL_UPDATE_CONFIRM message with the requested information and a command for the UE to return to the CELL_PCH state. However, if in the interim the UE detects uplink data to transmit, the UE may not be able to send a cell update request with this high priority cause (uplink data transmission), until it has possibly returned to the CELL_PCH state again. This scenario is illustrated in FIG. 4, showing the high priority cell update getting delayed.

In view of the problem recognized by the inventors, it is desirable, to provide a WTRU such as a UE that has a connection mode configuration that includes a transition state to implement transitioning to a duplex state where a temporary identifier is supplied to facilitate duplex communications in the duplex state.

SUMMARY

A wireless transmit/receive unit (WTRU) and method for wireless uplink communication to and downlink communication from a wireless network are provided. The WTRU has a selectively configurable transceiver that has various modes of operation. The WTRU transceiver has a network connected mode defined by a plurality of functional states including at least one monitoring state wherein the transceiver is configured for only downlink communications and a duplex state wherein the transceiver is configured for both uplink and downlink communications in which the WTRU has a received temporary identifier. The transceiver is configured to transition from a monitoring state upon occurrence of predefined WTRU events that are each associated with a respective uplink procedure initiation communication of a predefined procedure. At least one of the predefined procedures is intended to result in a network response that includes a temporary identifier. The transceiver is configurable into a transition state wherein the transceiver is configured to send only the uplink initiation communications and is otherwise configured only for downlink communications. The transceiver is configured to transition into the transition state upon occurrence of one of the predefined WTRU events such that after receiving a downlink response with a requested temporary identifier, the transceiver is configured into the duplex state.

The WTRU can be configured to communicate with the network via network base stations. In such case, the WTRU is preferably configured such that when the WTRU is communicating via a first base station in the duplex state, the WTRU becomes configured to the transition state when it is desired to switch routing of the wireless communication to be via a different base station.

In a preferred embodiment, the WTRU is configured as a User Equipment (UE) for wireless uplink communication to and downlink communication from a UMTS Terrestrial Radio Access Network (UTRAN). In such case, the UE's transceiver has a UTRAN connected mode defined by the plurality of functional states. Preferably, the UE transceiver is configurable into two monitoring states and is configured to transition to the duplex state from either of the two monitoring states by first entering the transition state and awaiting completion of all procedures initiated by the UE sending uplink initiation communications while in the transition state.

The two monitoring states into which the UE transceiver is configurable are preferably:

a URA_PCH state wherein no dedicated channel is allocated to the UE, the UE monitors a selected paging channel (PCH) via an associated paging indicator channel (PICH), no uplink activity is performed, a location of the UE is known on a UTRAN Registration area level according to a URA assigned to the UE during a prior URA update in CELL_FACH state; and a CELL_PCH state wherein no dedicated physical channel is allocated to the UE, the UE monitors a selected PCH via an associated PICH, no uplink activity is performed and a position of the UE is known by UTRAN on cell level according to the cell where the UE last made a cell update in CELL_FACH state.

The duplex state into which the UE transceiver is configurable is preferably a CELL_FACH state wherein no dedicated physical channel is allocated to the UE, the UE continuously monitors a FACH in the downlink, the UE is assigned a default common or shared transport channel in the uplink that it can use anytime according to the access procedure for that transport channel and the position of the UE is known by UTRAN on cell level according to the cell where the UE last made a cell update.

Where the WTRU is configured as a UE, the UE communicates with the UTRAN via UTRAN base stations. Accordingly, the UE's transceiver can be configured such that when the UE is communicating via a first base station in the duplex state, the UE becomes configured to the transition state when it is desired to switch routing of the wireless communication to be via a different base station.

A method of wireless communication for the WTRU is provided. The method includes transitioning the WTRU from the monitoring state to the duplex state via a transition state wherein at least one uplink procedure initiation communication is transmitted while otherwise maintaining the WTRU configured only for downlink communications. After receiving a downlink response with a requested temporary identifier, the WTRU is configured into the duplex state. Preferably, the transitioning into the duplex state from the monitoring state is implemented by first entering the transition state and awaiting completion of all procedures initiated by the sending of uplink initiation communications while in the transition state. Where the WTRU communicates with the wireless network via network base stations, the method can include configuring the WTRU into the transition state from the duplex state when the WTRU is communicating via a first base station in the duplex state and it is desired to switch routing of the wireless communication to be via a different base station.

Preferably the method is used for communication by a User Equipment (UE) with a UMTS Terrestrial Radio Access Network (UTRAN). In such case, the UE has a connected mode for wireless uplink communication to and downlink communication from a UTRAN defined by the plurality of functional states that preferably include two monitoring states, namely the URA_PCH state and the CELL_PCH state and the duplex state into which the UE transceiver is configurable is the CELL_FACH state. In such case, the transitioning into the duplex state from either of the two monitoring states is preferably implemented by first entering the transition state and awaiting completion of all procedures initiated by the UE sending uplink initiation communications while in the transition state.

Another aspect of the invention is to provide an application specific integrated circuit (ASIC) for the selectively configurable transceiver of the WTRU. The ASIC preferably has circuitry configured to define a network connected mode having a plurality of functional states including at least one monitoring state wherein the transceiver is configured for only downlink communications and a duplex state wherein the transceiver is configured for both uplink and downlink communications in which the WTRU has a received temporary identifier. The ASIC is preferably configured to transition the transceiver from a monitoring state upon occurrence of predefined WTRU events that are each associated with a respective uplink procedure initiation communication of a predefined procedure where at least one procedure is intended to result in a network response that includes a temporary identifier. The ASIC preferably has circuitry to configure the transceiver into a transition state wherein the transceiver is configured to send only the uplink initiation communications and is otherwise configured only for downlink communications. Preferably, the ASIC is configured to transition the transceiver into the transition state upon occurrence of one of the predefined WTRU events such that after receiving a downlink response with a requested temporary identifier, the transceiver is configured into the duplex state. In a preferred embodiment, the ASIC is configured for a User Equipment (UE) that is intended for wireless communication with a UMTS Terrestrial Radio Access Network (UTRAN).

Other objects and advantages of the invention will be apparent to those skilled in the art from the following description of a preferred embodiment, given by way of example and to be understood in conjunction with the accompanying drawings.

| TABLE OF ACRONYMS | |
|---|---|
| 2G | Second Generation Mobile Radio System Standard |
| 3GPP | Third Generation Partnership Project |
| ARIB | Association Of Radio Industries Businesses |
| ASIC | Application Specific Integrated Circuit |
| BLER | Block Error Rate |
| CCCH | Common Control Channel |
| CELL_DCH | UE Connected Mode Duplex State (dedicated resources) |
| CELL_FACH | UE Connected Mode Duplex State (common resources) |
| URA_PCH | UE Connected Mode Monitoring State |
| CN | Core Network |
| CS | Circuit Switched |
| C-RNTI | Cell Radio Network Temporary Identifier |
| DCCH | Dedicated Control Channel |
| DCH | Dedicated Channel |
| DL | Downlink |
| DTCH | Dedicated Traffic Channel |
| ETSI SMG | European Telecommunications Standard Institute - Special Mobile Group |
| FACH | Forward Access Channel |
| FDD | Frequency Division Duplex |
| GPRS | General Packet Radio Service |
| GSM | Global System For Mobile Telecommunications |
| HS | High Speed |
| HSDPA | High Speed Down Link Packet Access |
| HS-DSCH | High Speed Downlink Shared Channel |
| HS-SICH | High Speed Shared Information Channel |
| L1 | Layer 1 |
| MAC | Medium Access Control |
| PCH | Paging Channel |
| PS | Packet Switched |
| PSTN | Public Switched Telephone Network |
| RACH | Random Access Channel |
| RNC | Radio Network Controller |
| RRC | Radio Resource Control |
| SIR | Signal To Interference Ratio |
| TDD | Time-Division Duplex |
| TDSCDMA | Time-Division Synchronous Code-Division Multiple Access |
| TS | Time Slot |
| TRANS_CELL_FACH | UE Connected Mode Transition State |
| TTI | Transmission Time Interval |
| Tx | Transmission |
| UE | User Equipment |
| UL | Uplink |
| UL DCH | Uplink Dedicated Channel |
| UL SCH | Uplink Shared Channel |
| UMTS | Universal Mobile Telecommunication System |
| URA | UTRAN registration area |
| URA_PCH | UE Connected Mode Monitoring State |
| U-RNTI | UTRAN Radio Network Temporary Identifier |
| UTRA | Universal Terrestrial Radio Access |
| UTRA TDD | UMTS Terrestrial Radio Access Time Division Duplex |
| UTRAN | UMTS Terrestrial Radio Access Network |
| WTRU | Wireless Transmit Receive Unit |

DETAILED DESCRIPTION OF THE PREFERRED EMBODIMENTS(S)

The present invention is described with reference to the drawing figures wherein like numerals represent like elements throughout. The terms base station, wireless transmit/receive unit (WTRU) and mobile unit are used in their general sense.

The term base station as used herein includes, but is not limited to, a base station, Node-B, site controller, access point, or other interfacing device in a wireless environment that provides WTRUs with wireless access to a network with which the base station is associated.

The term WTRU as used herein includes, but is not limited to, user equipment (UE), mobile station, fixed or mobile subscriber unit, pager, or any other type of device capable of operating in a wireless environment. WTRUs include personal communication devices, such as phones, video phones, and Internet ready phones that have network connections. In addition, WTRUs include portable personal computing devices, such as PDAs and notebook computers with wireless modems that have similar network capabilities. WTRUs that are portable or can otherwise change location are referred to as mobile units.

The present invention is particularly useful when used in conjunction with mobile units, i.e., mobile WTRUs. For example, the invention can be implemented in a UE of the conventional UTMS system illustrated in FIG. 1a.

The description that follows is directed to a preferred embodiment as implemented for a WTRU in the form of a UE that has a transceiver configured for wireless communication with a UTRAN. In particular, the UE preferably includes a configurable transceiver having a UTRAN connected mode defined by a plurality of functional states. The functional states preferably include CELL_PCH and URA_PCH monitoring states wherein the transceiver is configured for only downlink communications. The functional states also preferably include CELL_FACH and CELL_DCH duplex state wherein the transceiver is configured for both uplink and downlink communications in which the UE has a received temporary identifier.

Figure 5:
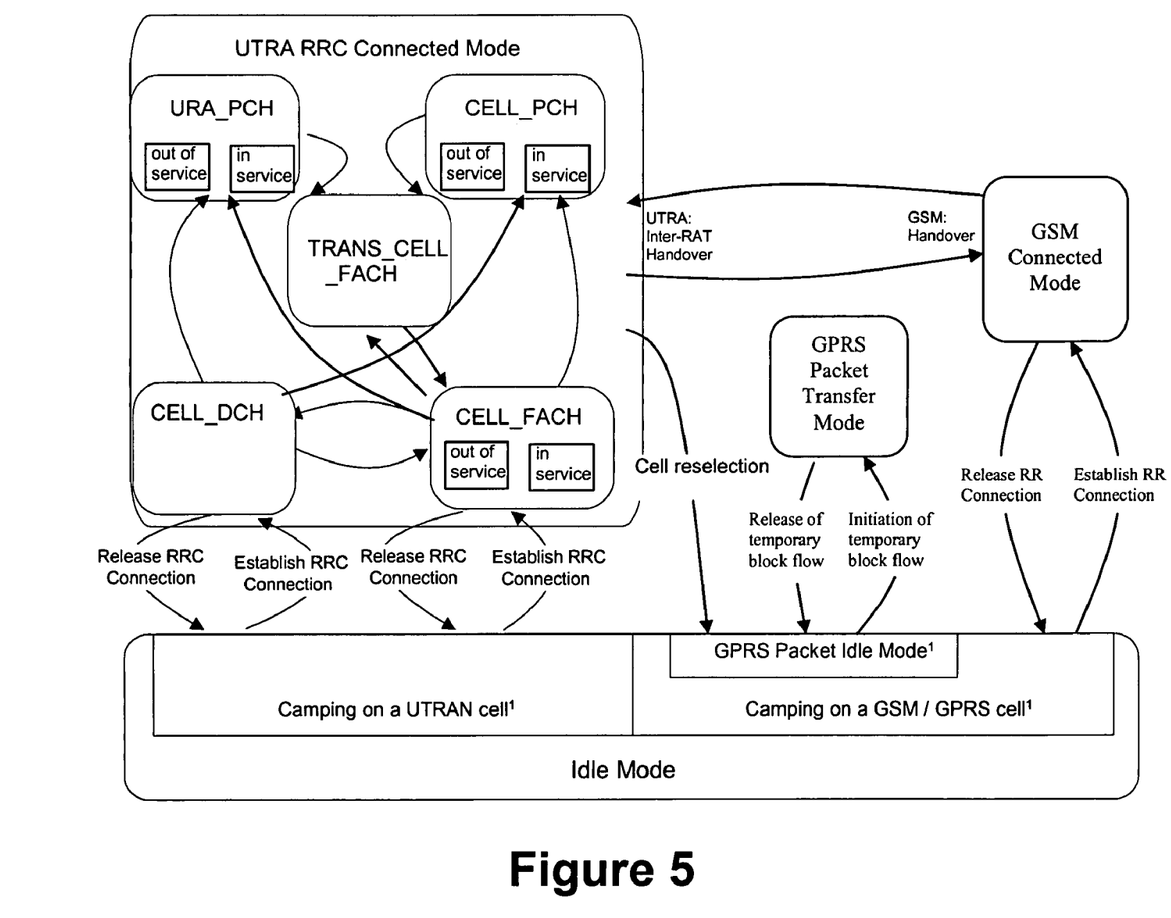
FIG. 5 is an illustration of a preferred embodiment of a modified UE state machine in accordance with the teachings of the present invention.

These monitoring and duplex states preferably have the functionality as described above for a conventional UE's RRC connected mode, except the transceiver also is configurable into a transition state, herein referred to as TRANS_CELL_FACH as illustrated in FIG. 5. The transceiver is configured to enter TRANS_CELL_FACH transition state in advance of entering the CELL_FACH duplex state to provide for the reception of a temporary identifier, so that the UE can properly conduct all of the duplex communications required in the conventional CELL_FACH duplex state.

Preferably, the transceiver when configured in the TRANS_CELL_FACH transition state permits the uplink procedure initiation communications of cell update procedures and has only half duplex DCCH or DTCH capability in the downlink direction. The UE is preferably configured to transition from the CELL_PCH or URA_PCH state to CELL_FACH state only via TRANS_CELL_FACH state. When in the CELL_PCH or URA_PCH state, the UE is without C-RNTI and an event calling for a cell or URA update (such as uplink data transmission or periodic update) preferably triggers entry to the TRANS_CELL_FACH state to enable the UE to perform the uplink procedure initiation communication of the called for cell update procedure.

Preferably, the UE remains in the TRANS_CELL_FACH state as long as a Cell Update or URA Update procedure is active whereupon the transceiver enters the CELL_FACH state if a temporary identifier is received. Accordingly, the UE will receive a temporary identifier before it enters the CELL_FACH state where the UE has the full duplex DCCH/DTCH capability.

Figure 6A:
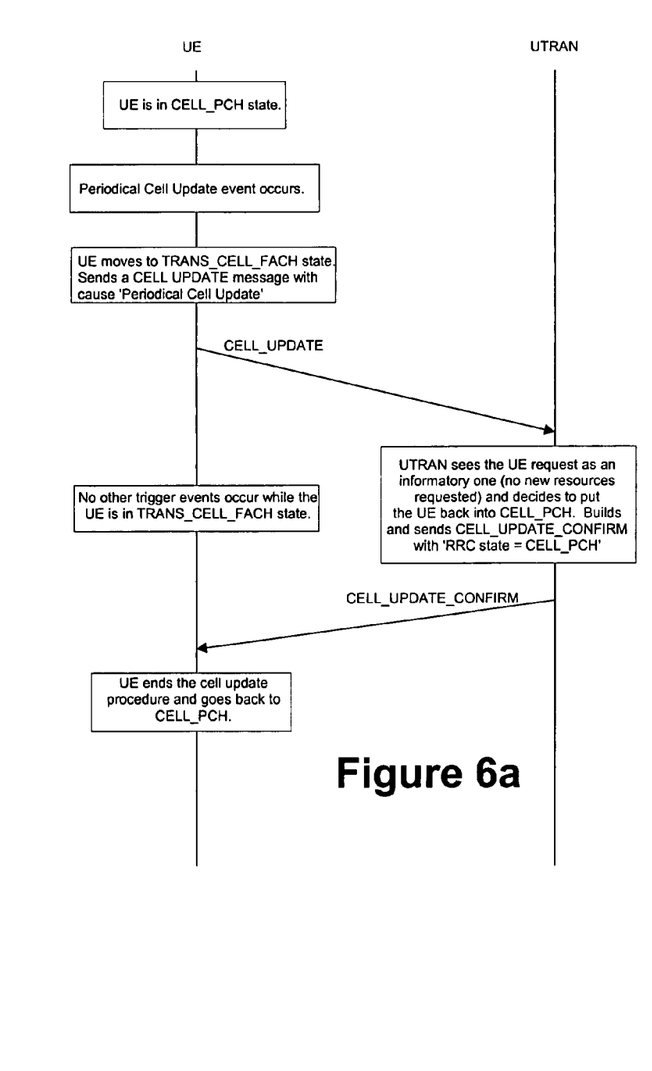
FIGS. 6a and 6b are time line illustrations of a UE utilizing a TRANS_CELL_FACH state in accordance with the teachings of the present invention.

Optionally, the transceiver can be configured to return to a CELL_PCH or URA_PCH state if no temporary identifier is received during the transition state after all cell update procedures initiated while in the TRANS_CELL_FACH state are completed. For example, as illustrated in FIG. 6a, where in response to a periodic update request from the UE, the UTRAN decides that the UE should return to the prior CELL_PCH monitoring state, the UE will make that state change where there is no intervening update procedure.

Figure 6B:
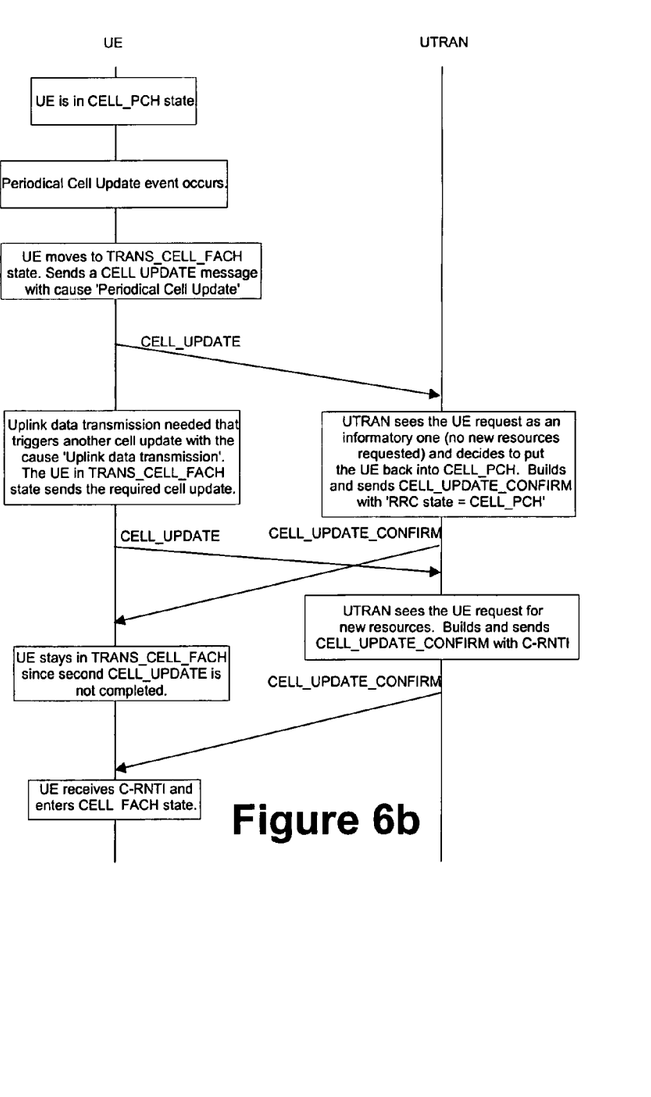

FIG. 6b illustrates a preferred scenario where there is an intervening procedure initiated while the UE is in the TRANS_CELL_FACH state. In that case the UE preferably does not return to the CELL_PCH state when receiving the command from the UTRAN, but awaits completion of the pending CELL_UPDATE that it initiated which results in the generation of a C-RNTI which is received by the UE and the cause the UE to assume the CELL_FACH state.

The UE preferably also enters the TRANS_CELL_FACH state from the CELL_FACH state in case of cell reselection. In such case, the UE remains in the TRANS_CELL_FACH state which switching the conduct of a wireless communication via a first base station to a second base station until a temporary identifier is received from the second base station whereupon the transceiver resumes the CELL_FACH state.

All RRC procedures requiring uplink DCCH or DTCH transmission are preferably defined or redefined to delay the procedure until a cell or URA update procedure is completed. Where such definitions are employed, a virtual TRANS_CELL_FACH state can be implemented even if the UE transceiver is not specifically configurable into a separate TRANS_CELL_FACH transition state that differs from the CELL_FACH duplex state. Also, the Cell Update and URA Update procedures are preferably enhanced to make it possible for UE to send an update request with a high priority cause (e.g. uplink data transmission), if the UE is without a C-RNTI.

By implementing the invention in a UE, the UE behavior is more clearly defined in terms of its transmission/reception capabilities when in different states in order to avoid unnecessary signaling between UE and UTRAN. Also, Cell Update and URA Update procedures are made more efficient because of the correct recognition of events in terms of UE transmission capabilities.

Preferably, the components of the UE transceiver that are configurable into the connected states illustrated in FIG. 5 are implemented on an single integrated circuit, such as an application specific integrated circuit (ASIC). However, the components may also be readily implemented on multiple separate integrated circuits.

The foregoing description makes references to a UE configured for wireless communication with a UTRAN as an example only and not as a limitation. The invention is applicable to WTRUs of other systems of wireless communication where monitoring states and duplex state are defined. Other variations and modifications consistent with the invention will be recognized by those of ordinary skill in the art without departing from the scope of the invention as described hereinabove.

What is claimed is:

1. A wireless transmit/receive unit (WTRU) comprising:
   a selectively configurable transceiver having a network connected mode defined by a plurality of functional states including:
   at least one monitoring state wherein the transceiver is configured for only downlink communications;
   a duplex state wherein the transceiver is configured for both uplink and downlink communications in which the WTRU has received temporary identifier; and a transition state in which the WTRU is enabled to request the temporary identifier required for the duplex state wherein the transceiver is configured to send only predefined uplink initiation communications and is otherwise configured only for downlink communications;

the transceiver configured to transition from a monitoring state into the transition state upon occurrence of predefined WTRU events that are each associated with a respective uplink procedure initiation communication of a predefined procedure where at least one procedure requests a network response that includes the temporary identifier: and the transceiver configured to transition from the transition state into the duplex state such that after receiving a downlink response with the temporary identifier.

2. The WTRU according to claim 1 wherein the WTRU is configured such that when the WTRU is communicating via a first base station in the duplex state, the WTRU becomes configured to the transition state when it is desired to switch routing of the wireless communication to be via a different base station.

3. A User Equipment (UE) for wireless communication with a UMTS Terrestrial Radio Access Network (UTRAN) comprising:

a selectively configurable transceiver having a UTRAN connected mode defined by a plurality of functional states including:

at least one monitoring state wherein the transceiver is configured for only downlink communications;

a duplex state wherein the transceiver is configured for both uplink and downlink communications in which the UE has received a temporary identifier; and a transition state in which the WTRU is enabled to request the temporary identifier required for the duplex state wherein the transceiver is configured to send only the uplink initiation communications and is otherwise configured only for downlink communications;

the transceiver configured to transition from a monitoring state into the transition state upon occurrence of predefined UE events that are each associated with a respective uplink procedure initiation communication of a predefined procedure where at least one procedure requests a network response that includes the temporary identifier; and the transceiver configured to transition from the transition state into the duplex state such that after receiving a downlink response with the temporary identifier.

4. The UE according to claim 3 wherein the UE transceiver is configurable into two monitoring states and is configured to transition to the duplex state from either of the two monitoring states by first entering the transition state and awaiting completion of all procedures initiated by the UE sending uplink initiation communications while in the transition state.

5. The UE according to claim 4 wherein the two monitoring states into which the UE transceiver is configurable are:

a URA PCH state wherein no dedicated channel is allocated to the UE, the UE monitors a selected paging channel (PCH) via an associated paging indicator channel (PICH), no uplink activity is performed, a location of the UE is known on a UTRAN Registration area level according to a URA assigned to the UE during a prior URA update in CELL FACH state; and a CELL PCH state wherein no dedicated physical channel is allocated to the UE, the UE monitors a selected PCH via an associated PICH, no uplink activity is performed and a position of the UE is known by UTRAN on cell level according to the cell where the UE last made a cell update in CELL FACH state; and the duplex state into which the UE transceiver is configurable is a CELL FACH state wherein no dedicated physical channel is allocated to the UE, the UE continuously monitors a FACH in the downlink, the UE is assigned a default common or shared transport channel in the uplink that it can use anytime according to the access procedure for that transport channel and the position of the UE is known by UTRAN on cell level according to the cell where the UE last made a cell update.

6. The UE according to claim 5 wherein the UE is configured such that when the UE is communicating via a first base station in the duplex state, the UE becomes configured to the transition state when it is desired to switch routing of the wireless communication to be via a different base station.

7. The UE according to claim 3 wherein the UE is configured such that when the UE is communicating via a first base station in the duplex state, the UE becomes configured to the transition state when it is desired to switch routing of the wireless communication to be via a different base station.

8. A method of wireless communication comprising:

providing a wireless transmit/receive unit (WTRU) having a connected mode defined by a plurality of functional states including a monitoring state wherein the WTRU is configured for only downlink communications, a duplex state wherein the WTRU is configured for both uplink and downlink communications in which the WTRU has received a temporary identifier, and a transition state in which the WTRU is enabled to request the temporary identifier required for the duplex state wherein the UE is configured to send only predefined uplink initiation communications and is otherwise configured only for downlink communications;

transitioning the WTRU from the monitoring state to the duplex state including:

transitioning from the monitoring state to the transition state;

transmitting an uplink procedure initiation communication requesting the temporary identifier while in the transition state; and receiving a downlink response with the temporary identifier.

9. The method according to claim 8 wherein the transitioning from the monitoring state to the duplex state is implemented by awaiting completion of all procedures initiated in the transition state.

10. The method according to claim 8 further comprising configuring the WTRU into the transition state from the duplex state when the WTRU is communicating via a first base station in the duplex state and it is desired to switch routing of the wireless communication to be via a different base station.

11. A method of wireless communication comprising:

providing a User Equipment (UE) configured for use with a UMTS Terrestrial Radio Access Network (UTRAN) and having a connected mode defined by a plurality of functional states including a monitoring state wherein the UE is configured for only downlink communications, a duplex state wherein the UE is configured for both uplink and downlink communications in which the UE has a temporary identifier, and a transition state in which the WTRU is enabled to request the temporary identifier required for the duplex state wherein the UE is configured to send only predefined uplink initiation communications and is otherwise configured only for downlink communications; and transitioning the UE from the monitoring state to the duplex state including:

transitioning from the monitoring state to the transition state;

transmitting an uplink procedure initiation communication requesting the temporary identifier while in the transition state; and after receiving a downlink response with the temporary identifier.

12. The method according to claim 11 where the UE is configurable into two monitoring states, namely:

a URA_PCH state wherein no dedicated channel is allocated to the UE, the UE monitors a selected paging channel (PCH) via an associated paging indicator channel (PICH), no uplink activity is performed, a location of the UE is known on a UTRAN Registration area level according to a URA assigned to the UE during a prior URA update in CELL_FACH state, and a CELL PCH state wherein no dedicated physical channel is allocated to the UE, the UE monitors a selected PCH via an associated PICH, no uplink activity is performed and a position of the UE is known by UTRAN on cell level according to the cell where the UE last made a cell update in CELL FACH state, and where the duplex state into which the UE is configurable is a CELL FACH state wherein no dedicated physical channel is allocated to the UE, the UE continuously monitors a FACH in the downlink, the UE is assigned a default common or shared transport channel in the uplink that it can use anytime according to the access procedure for that transport channel and the position of the UE is known by UTRAN on cell level according to the cell where the UE last made a cell update, the method wherein:

the transitioning from either of the two monitoring states to the duplex state is implemented by first entering the transition state and then awaiting completion of all procedures initiated by the UE sending uplink initiation communications in the transition state.

13. The method according to claim 12 further comprising configuring the UE into the transition state from the duplex state when the UE is communicating via a first base station in the duplex state and it is desired to switch routing of the wireless communication to be via a different base station.

14. The method according to claim 11 further comprising configuring the UE into the transition state from the duplex state when the UE is communicating via a first base station in the duplex state and it is desired to switch routing of the wireless communication to be via a different base station.

15. An application specific integrated circuit (ASIC) for a wireless transmit/receive unit (WTRU) the ASIC having circuitry configured to define a network connected mode having a plurality of functional states including:

at least one monitoring state wherein the transceiver is configured for only downlink communications;

a duplex state wherein the transceiver is configured for both uplink and downlink communications in which the WTRU has received a temporary identifier; and a transition state in which the WTRU is enabled to request the temporary identifier required for the duplex state wherein the transceiver is configured to send only uplink initiation communications and is otherwise configured only for downlink communications;

the ASIC configured to transition the transceiver from a monitoring state into the transition state upon occurrence of predefined WTRU events that are each associated with a respective uplink procedure initiation communication of a predefined procedure where at least one procedure requests a network response that includes the temporary identifier; and the transceiver configured to transition from the transition state into the duplex state after receiving a downlink response with the temporary identifier.

16. The ASIC according to claim 15 configured for a User Equipment (UE) that is intended for wireless communication with a UMTS Terrestrial Radio Access Network (UTRAN).

\* \* \* \* \*

UNITED STATES PATENT AND TRADEMARK OFFICE
CERTIFICATE OF CORRECTION

| | |
|---|---|
| PATENT NO. | : 7,406,314 B2 |
| APPLICATION NO. | : 10/878751 |
| DATED | : July 29, 2008 |
| INVENTOR(S) | : Sanjeev Sharma |

It is certified that error appears in the above-identified patent and that said Letters Patent is hereby corrected as shown below:

IN THE DRAWINGS

At FIG. 3, 3rd box from top, line 2, before the word "message", delete "CELL UPDATE" and insert therefor --CELL_UPDATE--.

At FIG. 4, 3rd box from top, line 2, before the word "message", delete "CELL UPDATE" and insert therefor --CELL_UPDATE--.

At FIG. 6a, 3rd box from top, line 2, before the word "message", delete "CELL UPDATE" and insert therefor --CELL_UPDATE--.

At FIG. 6b, 3rd box from top, line 2, before the word "message", delete "CELL UPDATE" and insert therefor --CELL_UPDATE--.

At FIG. 6b, 6th box from top, line 2, before the word "state", delete "CELL FACH" and insert therefor --CELL_FACH--.

IN THE SPECIFICATION

At column 1, line 10, after the word "priority", insert --from--.

At column 2, line 34, before the word "intermediary", delete "provides", and insert therefor --provide--.

At column 4, line 2, before the word "system", delete "reads" and insert therefor --read--.

At column 4, line 3, before the words "the BCH", delete "reads" and insert therefor --read--.

At column 4, line 34, before the word "update", delete "ura" and insert therefor --URA--.

UNITED STATES PATENT AND TRADEMARK OFFICE
CERTIFICATE OF CORRECTION

| | |
|---|---|
| PATENT NO. | : 7,406,314 B2 |
| APPLICATION NO. | : 10/878751 |
| DATED | : July 29, 2008 |
| INVENTOR(S) | : Sanjeev Sharma |

It is certified that error appears in the above-identified patent and that said Letters Patent is hereby corrected as shown below:

At column 5, line 28, after the word "system", insert --other--.

At column 5, line 32, before the word "measure-", delete "transmit" and insert therefor --transmits--.

At column 6, lines 3 - 6, after the word "access.", begin a new paragraph beginning with "The release of an RRC ... release signaling.".

At column 6, line 16, after the word "although", delete "is" and insert therefor --in--.

At column 6, line 27, after the word "system", insert --other--.

At column 6, line 28, after the words "mode and", delete "make" and insert therefor --makes--.

At column 6, line 38, before the word "measurement", delete "transmit" and insert therefor --transmits--.

At column 6, line 60, after the word "state", through column 7, line 6, begin a new paragraph beginning with "If the network ... of the new cell.".

At column 7, lines 11 - 13, begin a new paragraph beginning with "The release of an RRC ... release signaling.".

At column 7, line 23, after the word "although", delete "is" and insert therefor --in--.

At column 7, line 38, after the word "system", insert --other--.

At column 7, line 41, before the word "measurement", delete "transmit" and insert therefor --transmits--.

UNITED STATES PATENT AND TRADEMARK OFFICE
CERTIFICATE OF CORRECTION

PATENT NO. : 7,406,314 B2
APPLICATION NO. : 10/878751
DATED : July 29, 2008
INVENTOR(S) : Sanjeev Sharma It is certified that error appears in the above-identified patent and that said Letters Patent is hereby corrected as shown below:

At column 7, lines 54 - 60, after "b) C-RNTI", begin a new paragraph beginning with "While using the ... CELL_FACH state.".

At column 8, line 57, after the words "UE then", delete "send" and insert therefor --sends--.

At column 8, line 62, after the words "occurs that", delete "require" and insert therefor --requires--.

At column 13, line 24, after the word "conventional", delete "UTMS" and insert therefor --UMTS--.

At column 13, line 33, after the word "duplex", delete "state" and insert therefor --states--.

At column 14, line 16, after the words "UE and", delete "the cause" and insert therefor --causes--.

At column 14, line 21, after the word "state", delete "which" and insert therefor --while--.

IN THE CLAIMS

At claim 12, column 17, line 9, before the words "the UE", delete "where", and insert therefor --wherein--.

Signed and Sealed this

Sixteenth Day of December, 2008

JON W. DUDAS
*Director of the United States Patent and Trademark Office*